United States Patent [19]

Haukjem et al.

[11] Patent Number: 4,660,184
[45] Date of Patent: Apr. 21, 1987

[54] DEVICE FOR USE IN BOREHOLE-SEISMIC MEASUREMENTS AT SEA

[75] Inventors: Mårten Haukjem; Olav Lindtjorn, both of Hovik, Norway

[73] Assignee: Geco Well Services A.S., Hovik, Norway

[21] Appl. No.: 758,740

[22] Filed: Jul. 25, 1985

[30] Foreign Application Priority Data

Jul. 25, 1984 [NL] Netherlands ............................ 843010

[51] Int. Cl.⁴ ......................... G01V 1/38; B63B 35/38; B66C 13/02
[52] U.S. Cl. ..................................... 367/16; 181/110; 181/111; 114/61; 294/66.1; 294/81.1
[58] Field of Search ..................... 367/15-19; 181/110, 111, 113; 73/641; 114/61; 294/66.1, 81.1, 81.5, 111

[56] References Cited

U.S. PATENT DOCUMENTS

| | | | |
|---|---|---|---|
| 3,019,412 | 1/1962 | Crawford | 367/18 |
| 3,499,409 | 3/1970 | Bernhard | 114/61 |
| 3,509,842 | 5/1970 | Mitchell | 114/61 |
| 3,572,462 | 3/1971 | Gray | 181/110 |
| 4,326,271 | 4/1982 | Ziolkowski | 367/16 |

OTHER PUBLICATIONS

"Vertical Seismic Profiling", Part A: Principles by Bob A. Handage, Geophysical Press, Landa-Amst, 1983.

Primary Examiner—Deborah L. Kyle
Assistant Examiner—Ted L. Parr
Attorney, Agent, or Firm—Holman & Stern

[57]  ABSTRACT

A device for use in borehole-seismic measurements at sea whereby seismic energy sources (7) are suspended below the surface (D) and connected to a handling line (2) which is operated by a crane arrangement on a vessel. By suspension of a minimum of two seismic energy sources (7) from a stand (3) at a distance from mutually separated floats (1) rotatably connected on horizontal axes (9) to the stand, seismic energy sources (7) can be placed and maintained at a constant depth below the surface, whereby several seismic sources (7) can be used simultaneously. The stand (3) is equipped in its central area with a guide (4) for the handling line (2), which is divided at the end connected to the respective energy sources' (7) suspension lines (8), which simplifies the positioning of the device.

10 Claims, 3 Drawing Figures

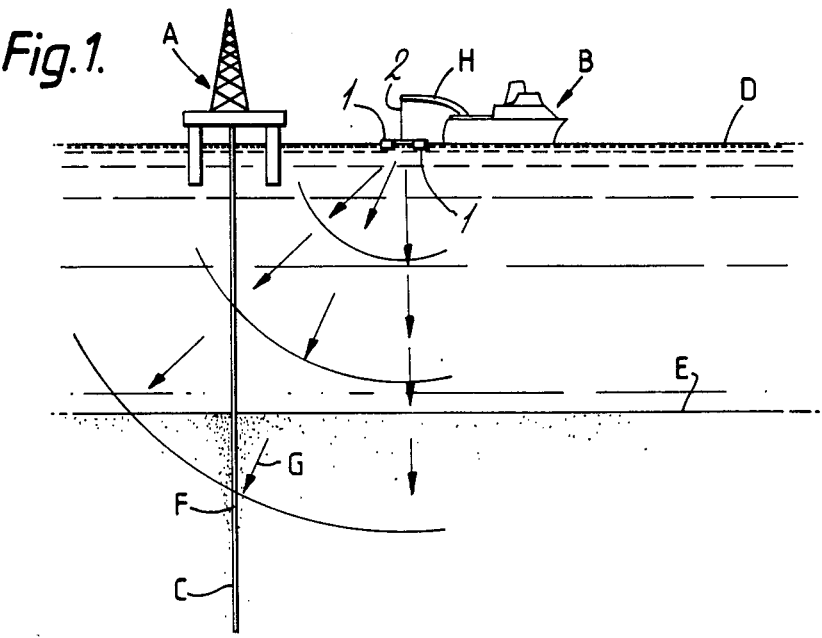
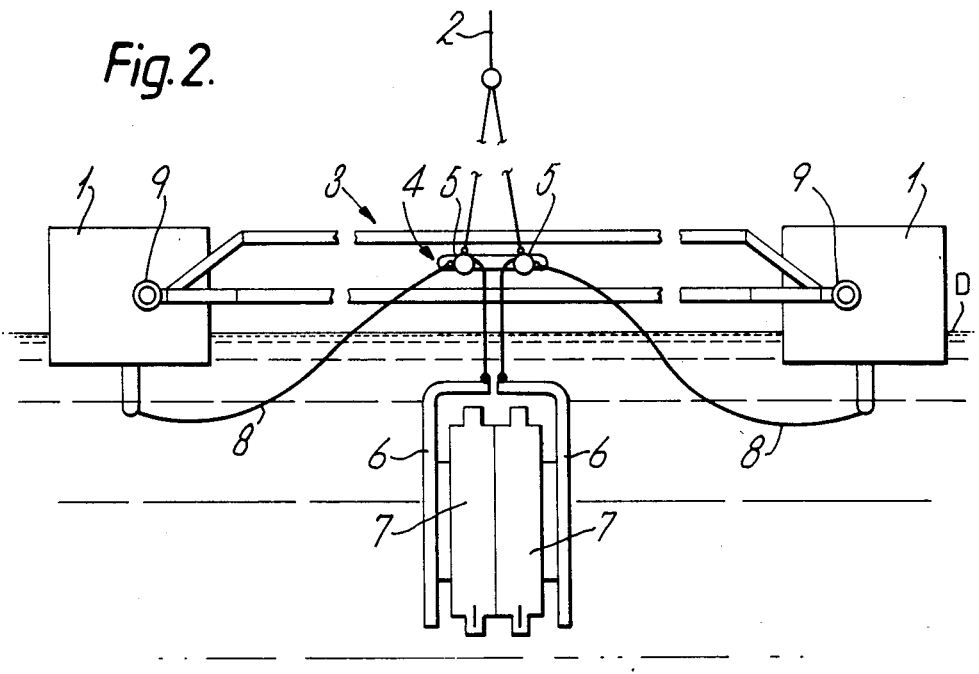

DEVICE FOR USE IN BOREHOLE-SEISMIC MEASUREMENTS AT SEA

BACKGROUND OF THE INVENTION

1. Field of the Invention

The invention relates to means for use in borehole-seismic measurements at sea, whereby seismic energy sources are placed below the surface of the water suspended on a handling line which is led over a beam arrangement mounted on a vessel.

2. Description of the Prior Art

In recent years borehole-seismic measurements have become an increasingly important method of surveying the conditions around a borehole. This type of measurement, which is also described as VSP ("vertical seismic profiling") is a method of measuring by which a seismic signal generated on the surface is recorded by geophones which are placed at various depths in the borehole. The directional distribution of the geophones used in these measurements will therefore be in vertical direction instead of the side positioning of geophones employed in normal seismic surveys.

The normal procedure in performing borehole seismic measurements at sea has until now been to suspend a seismic energy source on a crane arrangement which can be placed either on the drilling platform itself or, in order to achieve a greater distance and greater variation in relation to the drilling platform, the crane arrangement can be placed on a vessel, which can be positioned in the immediate vicinity of the platform construction. Although it has been possible in this way to achieve a favorable positioning of the actual energy source in relation to the borehole, some difficulties have still arisen when using this measuring technique. When making borehole-seismic measurements it is essential to obtain as clear a signal as possible with regard to frequency and the seismic energy sources employed, which may be waterguns or airguns, are also sensitive with regard to hydrostatic pressure on the energy source, i.e. it is vital to maintain a constant or fixed depth with respect to the surface of the water.

Since it is advisable to work at special frequencies, the size of the energy sources employed is also limited, which means that it may be practical to use more than one source at a time. In order to achieve a pure pulse shape, i.e. without any appreciable fluctuations, it will also be advantageous to work with several seismic sources tuned to each other which can jointly be regarded as a so-called "point formed" transmitter.

BRIEF SUMMARY OF THE INVENTION

The object of the present invention is to provide an arrangement which will fulfill the above mentioned requirements.

A further object of the invention is therefore to provide an arrangement by means of which the seismic energy sources can be positioned at a correct and constant depth below the surface of the water independent of whether or not there is wave motion in the water.

By means of the arrangement in accordance with the invention it will thus be possible to employ at least two energy sources together, which will provide a stronger resultant pulse, whereby the energy sources can also be tuned in relation to each other in such a way as to achieve a material reduction in noise frequencies in the signals. The device will enable the energy sources to be kept at the same depth in the water and thus maintain an equal hydrostatic pressure. This also enables waterguns to be used instead of airguns.

BRIEF DESCRIPTION OF THE INVENTION

The invention will now be further described in detail with reference to a practical example depicted in the drawing wherein:

FIG. 1 is a purely schematic sketch illustrating the performance of borehole-seismic measurements at sea;

FIG. 2 is a schematic elevational side view of the means according to the invention in elevated condition, with the stand shown foreshortened in width.

DETAILED DESCRIPTION OF THE PREFERRED EMBODIMENTS

Figure 3:
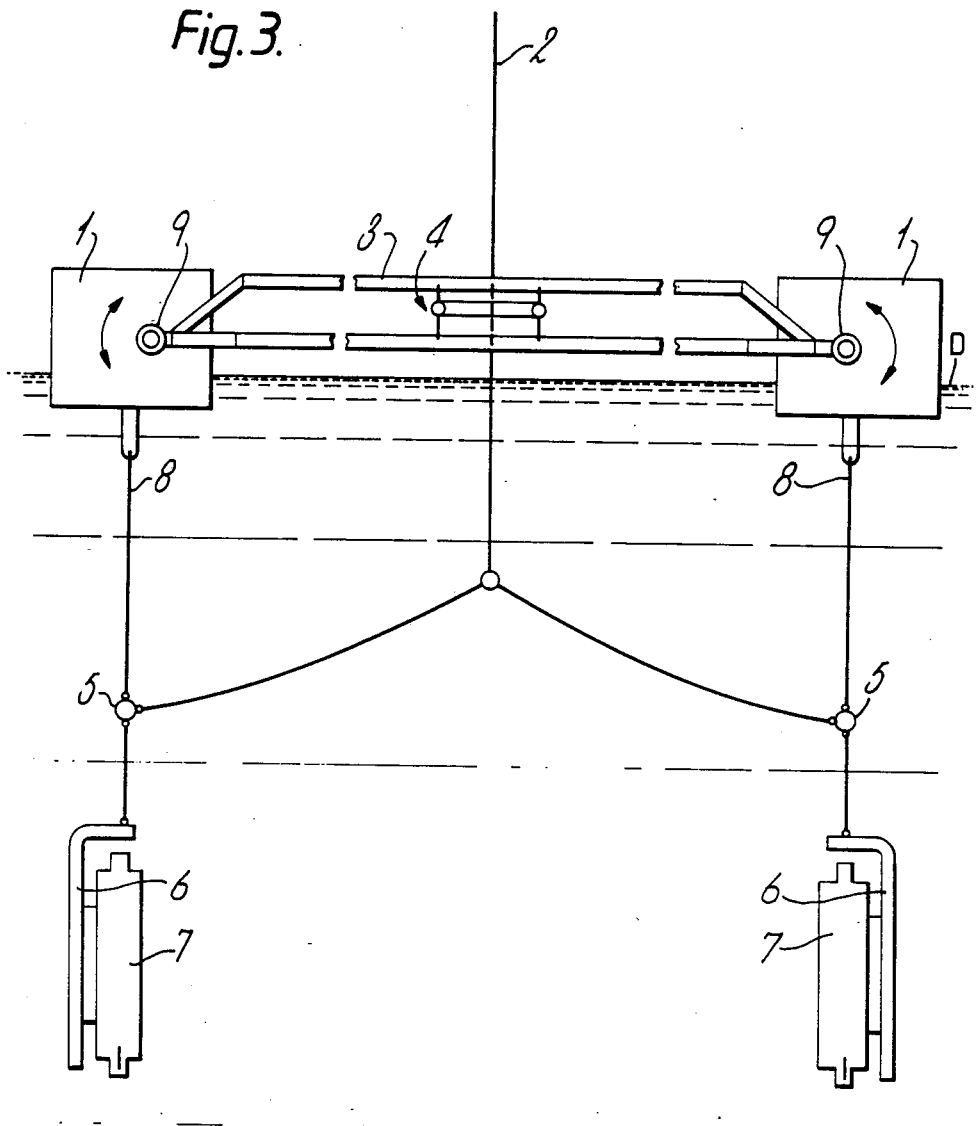
FIG. 3 is a view similar to FIG. 2 showing the invention in deployed condition ready for the execution of the measurement.

FIG. 1 of the drawing illustrates the principle of borehole-seismic measuring at sea. A bore string is lowered from a drilling platform A and a well or borehole C is drilled in the seabed E. In the immediate vicinity of the platform A on the surface of the sea D is situated a vessel B with a crane arrangement H, and which is suspended a means according to the invention which has been allotted the reference numbers 1 and 2. From this energy source are transmitted seismic pulses which are illustrated by arrows. At a point F in the borehole is placed a geophone which receives the direct signal G from the seismic source, after it has penetrated part of the earth's strata. In addition will be received signals which are reflected from other strata in the earth.

From these signals at point F, which can be moved in a vertical direction, it will be possible to obtain information on the structure of the seabed. Vessel B will also be moved to several other predetermined positions.

In order to achieve an optimal emission of seismic energy with the features described in the introduction, a device has been placed on the crane arrangement H according to the invention. In the example illustrated, the invention is depicted by an arrangement designed for two seismic energy sources, but it would be within the skill of a skilled person in this art to extend the system to include more energy sources within the framework of the invention, and alternatively more frames of the type shown can be suspended alongside each other if so desired.

The means according to the invention includes two substantial floats 1, which are designed to give the necessary buoyancy (differentiated buoyancy) in order to support the seismic energy sources. The term "differentiated buoyancy" is intended to mean that the buoyancy of the float has been "differentiated" in the buoyancy direction, i.e. has been made progressively increasing by submerging. The floats 1 are connected by means of a frame 3 which is constructed of stays as in a trusswork construction which will ensure a fixed distance between the floats. A suitable distance in this respect is approximately 6 m. The point of connection between the float and the stay is denoted by 9 and is so designed as to enable the float to turn freely on a horizontal axis which extends through the float. This results in the floats having the ability to move independently of each other in a vertical direction and being able to perform a tilting movement or a swinging movement as indicated by the arrows thereon in FIG. 3, thus enabling the floats to follow the movement of the sea.

Under the floats 1 is a line arrangement 8 of a fixed length on which are suspended seismic energy sources 7, which in the example illustrated are placed in a securing device 6. By means of this fixed suspension on line 8 and with the ability of the floats 1 to follow the wave movements, the seismic energy source 7 will at all times be positioned at the same depth in relation to the surface D, consistent with the wave motion of the sea. This is very important for certain types of energy source.

In order to lower the device into the water and raise it up again, it is equipped with a special line guide. This kind of simplification is a vital factor in the handling of the system and is particularly effective on certain types of boats with a particular crane positioning on board.

The device as per the invention is attached to a handling line 2 which can be raised and lowered on the boom arrangement H. The handling line 2 is divided into two parts at the end, each part being led to a connection point with the energy sources' 7 suspension lines 8, and are thus connected to a junction or connection point 5 on this line 8. Point 5 is preferably arranged at a suitable distance from the securing device 6 for the seismic energy sources 7 to prevent the energy sources 7 from coming into contact with the actual frame 3 when they are in a raised position. For this purpose a ball-shaped body is fixed to connection point 5.

The handling line 2 is led through a ring-shaped or sleeve-shaped guide 4 in the central part of the frame 3. When the device is raised, the handling line 2 will be drawn through the sleeve ring 4 and gradually join together the two end branch parts of the line, which lead to the points 5. In this way the energy sources 7 will be drawn towards each other and remain suspended in the central area below the frame, thus being protected from blows from the side by the projecting frame. The raising function is limited by the ball-shaped bodies at point 5. In the peripheral area of the guide 4 grooves have been made which are intended to work in conjunction with the balls 5, in such a way that in a fully raised position these will sit in the grooves, thus locking the device in this position. The frame with floats and energy sources can be moved in this position with the beam H or be hauled on board.

A simpler solution which may be considered is to omit the balls 5 and instead to equip the securing device 6 with stoppers against the guide 4.

The means required for operation of the seismic energy sources are led through conduits or hoses which are connected with the lines 8, or alternatively led parallel to these. These operation means may include air supply lines, firing pulse control wires, wires and for near field hydrophones, etc. For reasons of clarity, these means and their conduits are not indicated in the diagram. The invention is capable of manifold variation within the scope of the claims.

We claim:

1. Apparatus for use in making borehole-seismic measurements at sea comprising:
    a frame member;
    a plurality of separate floats pivotally mounted on horizontal axes to said frame member in spaced relationship for supporting said frame member at sea;
    a separate seismic energy means suspension line connected to each float;
    a separate seismic energy means connected to each suspension line in spaced relation to said floats;
    guide means on said frame member in the central part thereof between said floats;
    a handling line passing through said guide means and having an upper end and a lower end, said lower end having two separate parts each connected at one end to a common point on said handling line and at the other end to a respective one of said suspension lines between a respective float and seismic energy means; and
    means connected to said handling line for raising and lowering said handling line, so that when said handling line is raised through said guide means from the position where said seismic energy means are substantially separated, said guide means draws said seismic energy means toward each other.

2. Apparatus as claimed in claim 1 wherein:
    said guide means comprises a ring-shaped member.

3. Apparatus as claimed in claim 2 wherein:
    ball-shaped members are provided in each suspension line between said respective float and seismic energy means;
    said other ends of said separate parts at the lower end of said handling line are each connected to a respective one of said ball-shaped members; and
    peripheral grooves are provided in said guide member having surfaces substantially conforming to said ball-shaped members for receiving said ball-shaped members when said handling line is raised to a predetermined position.

4. Apparatus as claimed in claim 1 wherein:
    said guide means comprises a hollow sleeve member.

5. Apparatus as claimed in claim 1 and further comprising:
    a securing device for supporting each seismic energy means, said suspension lines being connected to said securing devices, so that said securing devices engage said guide means at a predetermined raised position of said handling line to prevent further raising thereof.

6. Apparatus as claimed in claim 1 wherein:
    said guide means further draws said seismic energy means upwardly when said handling line is raised.

7. Apparatus as claimed in claim 1 wherein said means for raising and lowering said handling line comprises:
    a vessel; and
    a crane means mounted on said vessel operatively connected to said handling line for raising and lowering said handling line.

8. Apparatus as claimed in claim 1 wherein:
    said suspension lines each comprise a joint conduit line for firing control and pressure medium supply conduits for operating said seismic energy means.

9. Apparatus as claimed in claim 1 wherein:
    said suspension lines and said two parts at the lower end of said handling line comprise flexible cables.

10. Apparatus as claimed in claim 1 wherein:
    said frame member has spaced ends;
    said horizontal axes are on said ends of said frame member; and
    said floats are rotatably mounted on said axes for providing differentiated buoyancy where said buoying is progressively increased by submergence of the float.

* * * * *